Figure 1:
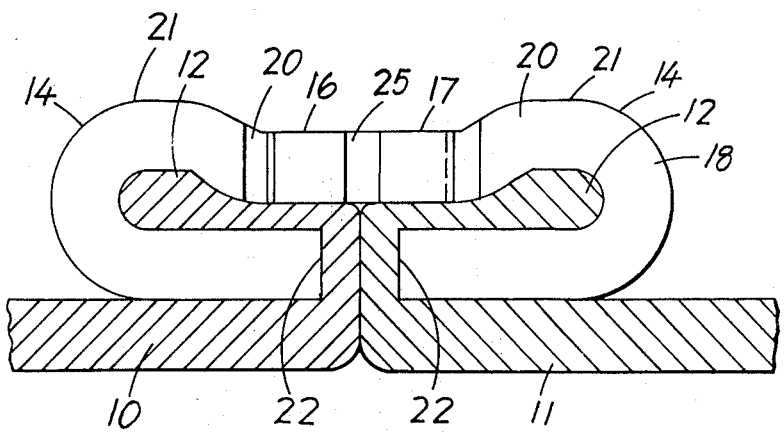

Dec. 22, 1964   G. DOELTER   3,161,933
CONTINUOUS FASTENERS
Filed Oct. 23, 1962   2 Sheets-Sheet 1

Inventor,
GANDOLPH DOELTER,
by Hall & Houghton
Attorney.

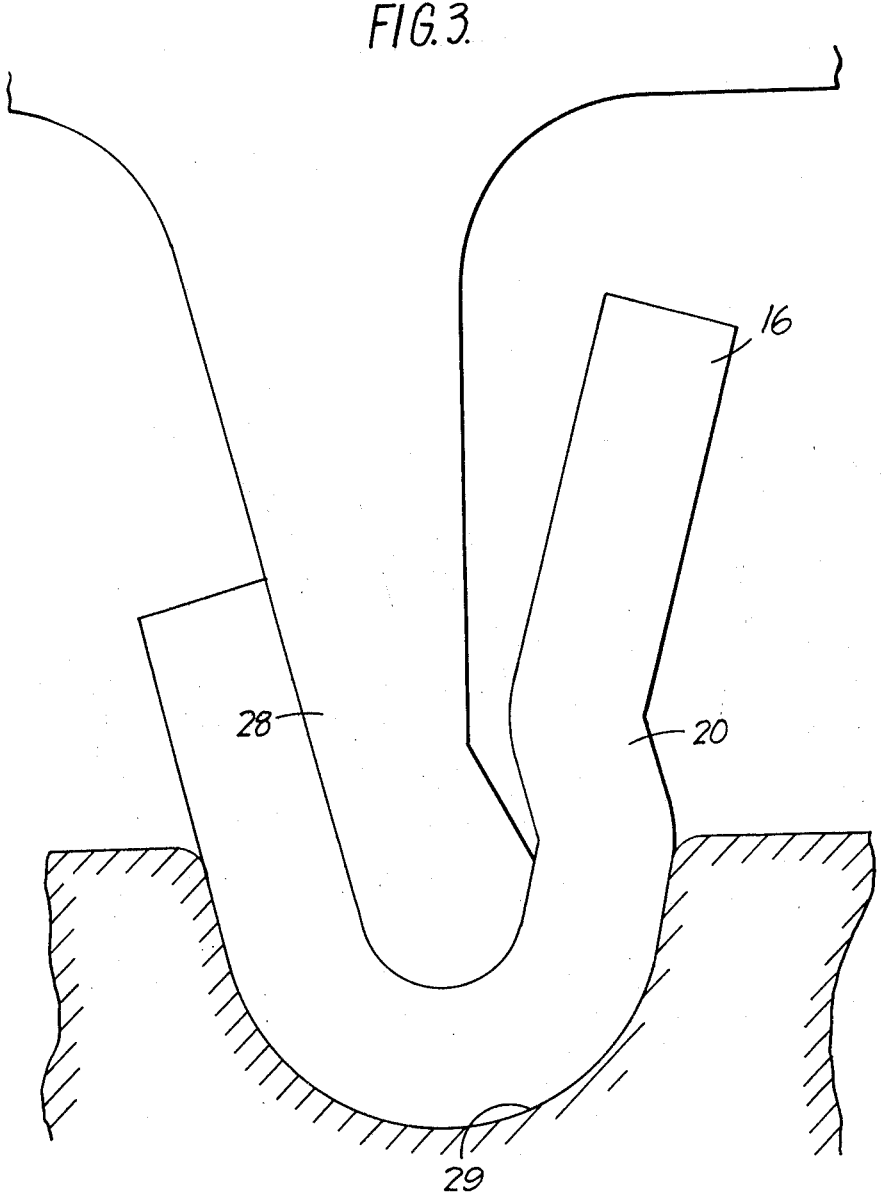

ns Dec. 22, 1964

3,161,933
CONTINUOUS FASTENERS
Gandolph Doelter, 96 Beaufort Mansions, Beaufort St., London SW. 3, England
Filed Oct. 23, 1962, Ser. No. 232,467
1 Claim. (Cl. 24—205.1)

The invention relates to continuous fasteners of the kind employed to join together edge portions of two tapes or sheets of flexible material (e.g. textile fabric) in face-to-face relation and which comprises for each tape or sheet, a row of fastener elements along the edge portion to be joined, each element having a shank with means at one end by which the element is secured to the flexible material, and an enlarged head at the other end, the heads of each row of elements fitting between the shanks of the elements of the other row when the fastener is closed and engaging behind the heads of said other row of elements to prevent separation of the sheets or tapes in the plane thereof. Fasteners of this kind are described, for example, in British specifications Nos. 723,998, 769,535, 769,536 and 769,537.

Fasteners of the above kind, as disclosed in the above-mentioned specifications, have for each tape or sheet of flexible material, a row of outer elements which, in substance, are of U-shape and clamp a fold of the flexible material around enlarged feet on the ends of the shanks of the fastener elements of that tape or sheet, there being one outer element for each fastener element. The outer elements serve to secure the fastener elements to the tape or sheet and also fulfill other functions. It is an object of the present invention to provide a construction of fastener of the above kind in which the need for such outer elements is obviated and which is simplified in other respects.

The invention provides a continuous fastener of the kind described in which the fastener elements are each formed of strip section material bent about an axis (or axes) parallel to its width to U-form with the end portion of one arm of the U-form being shaped to form the shank and the head of the element, at least a part of which head projects beyond the other arm, with the remainder of the U-form providing a root portion and with the mouth of the U-form facing towards the elements of the other row and having the edge portion of the flexible material secured within the U-form and in which, when the joint is closed, the heads of the fastener elements of each row overlie at least parts of the root portions of the fastener elements of the other row with portions of the tapes or sheets intervening, whereby not only is disengaging movement of the fastener elements in a direction perpendicular to the plane of the tapes or sheets precluded but also the two parts are held, substantially, against relative pivotal or hinging movement about an axis along the joint. Preferably the arm or the shank carrying the head is cranked inwardly of the U-form to clamp the flexible material against the other arm of the U-form, and to bring the head towards, or onto, the centre line of the U.

The edge portions of the tapes or sheets may be folded outwardly, at one face of the joint, around the ends of the other arms of the U-form and held, when the joint is closed, between the ends of the said other arms, the edge portions of the two tapes or sheets being held in, or substantially in, face-to-face contact whereby at this face of the joint, the elements are concealed.

In a preferred form of the invention the shanks are formed by shaping the edges of the material, for example, by pressing notches therein. It is further preferred that the edges of the strip section are rounded, the strip section material being produced for example by rolling a round wire to flat section.

The invention also provides the method of producing a fastener element as above described which method comprises the step of forming a shank in a piece of strip material by pressing into the edges of the material a pair of opposed notches to leave on one side of the notches a fastener head and on the other side the root portion of the fastener, and bending the piece of material to U-form.

The method may include the steps, carried out in any appropriate order, of bending the root portion of the strip to an open U or V form with the head attached by the shank to the end of one arm thereof, closing the U onto a piece of flexible tape or sheet material, cranking the head-carrying arm or the shank to bring the head towards, onto or even beyond the centre-line of the U-form and cutting the length of the strip used to form the element from a continuous length of the strip. Preferably the order in which the steps are carried out is first to press or pinch the strip to form the notches, then to crank the strip, then to cut off the length of strip, then to produce the open U-form and finally to close the U into gripping relation with the flexible material.

Figure 2:
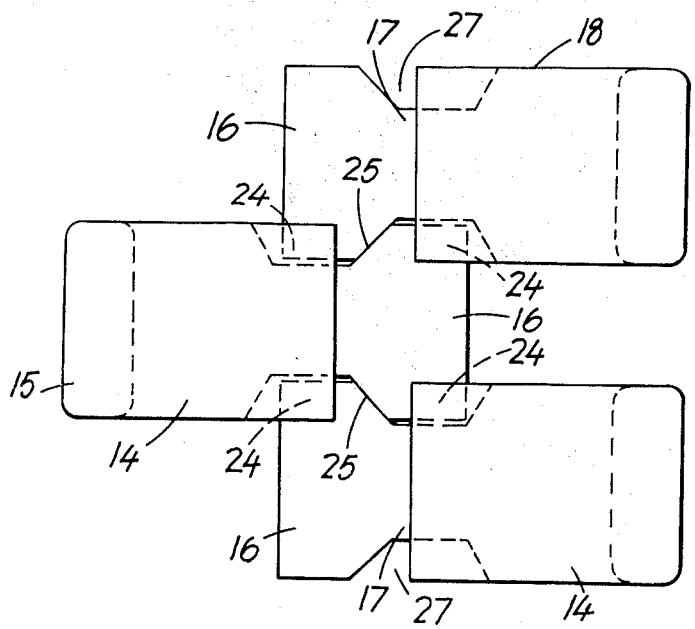

A specific example of how the invention may be carried into effect will now be described with reference to the accompanying drawings which are to a greatly enlarged scale and in which:

FIGURE 1 represent a cross-section through a fastener according to the invention, FIGURE 2 is a plan view of part of the fastener, the flexible material being omitted, and FIGURE 3 shows one stage in the manufacture of one of the fastener elements.

The fastener forming the subject of this example is employed to secure together two fabric tapes 10, 11 of which each has a beaded edge 12. Secured along the edge portion of each tape there is a row of elements 14, all of identical construction. The elements are produced from strip material having the section indicated at 15. The elements have heads 16, connected by shanks 17 to root portions 18. The root portions are turned over on themselves to U-form, the edges of the flexible tapes being clamped within the U-form. The arms of the root portions to which the shanks are connected, and the shanks, are cranked or joggled at 20 in order to bring the heads nearer to the centre lines of the U-form and below the level of the portions 21. The tapes are bent around the ends 22 of the other arms of the root portions and clamped together between their ends.

As may be seen at 24, the heads of the elements of each row overlie the root portions of the elements of the other row, the tapes intervening between the overlying portions. The two rows are thereby held against separating movement in the direction perpendicular to the plane of the paper in FIGURE 2 and are also held against pivotal movement about an axis along the rows. Also, as best seen in FIGURE 2, the heads 16 of each row fit between the shanks 17 of the other row and engage behind the heads of the other row, the engaging faces 25 being chamfered.

A slide, not shown, is employed for opening and closing the fastener.

The elements are each made from strips of the section shown at 15. To produce the shank 17, the notches 27 are pressed into the sides of the strip, no material being removed. The formation of the shank near the end of the strip produces the head 16, without further operation. The strip is joggled or cranked at 20 before or after the formation of the shank. To produce the U-form the strip is first pressed, by a former 28, into a mould 29. Subsequently the arms of the U-form are closed onto the tape. The length of the strip required to produce the element may be cut off as a first operation.

The strip may, if desired, be serrated or knurled, in the lengthwise direction, in order to increase the grip on the tapes.

The elements may be of metal or a thermoplastic material. In the latter case heat is employed to assist in the bending operation.

I claim:

A continuous fastener for joining together edge portions of two tapes of flexible material in face to face pressure-tight relation consisting of, for each tape, a row of fastener elements along the edge portion to be joined, each element formed of strip section material bent about an axis parallel to its width to U-form, the end portion of one arm of each U-shaped element being formed into a shank and a laterally enlarged head and the remainder of the U-shaped element providing a root portion, at least a part of said head projecting beyond the extremity of the root portion and each element being located with the mouth of the U-form facing towards the elements of the other row and having the edge portion of the flexible material secured within the U-form, the head of the element being joggled inwardly of the U-form to clamp the flexible material against the opposing section of the root portion of the U-form and to bring the head nearer the central plane of the U, the head, shank and root portions of the element being of substantially uniform thickness throughout, and the heads of the fastener elements of each row, when the joint is closed, overlying parts of the root portions of the elements of the other row with intervention therebetween only of portions of the tapes which are clamped between the head and root portions of said other row, whereby not only is disengaging movement of the fastener elements in a direction perpendicular to the plane of the tapes precluded but also the two elements are held, substantially, against relative pivotal movement about an axis along the joint.

References Cited by the Examiner

UNITED STATES PATENTS

| | | | |
|---|---|---|---|
| 1,992,254 | 2/35 | Sundback | 29—410 |
| 2,030,895 | 2/36 | Quisling | 24—205.12 |
| 2,116,712 | 5/38 | Prentice | 29—410 |
| 2,563,767 | 8/51 | Winterhalter | 24—205.1 |
| 2,959,833 | 11/60 | Ryser | 24—205.1 |
| 3,078,537 | 2/63 | Morin | 24—205.1 |

FOREIGN PATENTS 262,850   10/27   Italy.

DONLEY J. STOCKING, *Primary Examiner.*